Patented May 19, 1942

2,283,438

UNITED STATES PATENT OFFICE 2,283,438

CAPILLARY ACTIVE COMPOUND AND METHOD OF PRODUCING THE SAME

Winfrid Hentrich, Duesseldorf-Reisholz, Carl Albert Lainau, Duesseldorf, and Wilhelm Jakob Kaiser, Duesseldorf-Benrath, Germany, assignors, by mesne assignments, to The Procter & Gamble Company, Cincinnati, Ohio, a corporation of Ohio No Drawing. Application February 12, 1936, Serial No. 63,554. In Germany February 13, 1935

27 Claims. (Cl. 260—457)

This invention relates to capillary active substances and to methods of producing the same. These substances may be referred to broadly as compounds composed of a hydrogenated aromatic hydrocarbon nucleus having attached thereto both a non-aromatic hydrocarbon radical of at least three carbon atoms and also a radical containing a hydrophile group.

In recent years many new capillary active agents have been proposed and a few have gone into actual use but all of them are lacking in some desirable or necessary qualification. The unsatisfactory consideration may lie in the cost of the raw material, the cost of the production operations, the cost of purifying the raw material or the final product, or in the poor quality of the agent itself for imparting the desired degree of capillary activity to liquids or treating agents.

The object of the present invention is to provide capillary active substances suitable for the most varied wetting, cleaning, foaming and the like purposes, which overcome the above objections both as to total cost of production and as to quality of the products. The new substances in general are very stable in hard water as well as in acid and alkaline solutions.

In its broader aspects, the process of the present invention for preparing the capillary active substances involves the hydrogenation of a hydroxyaromatic hydrocarbon substituted in its nucleus by a non-aromatic hydrocarbon radical containing at least three carbon atoms and then a reaction of the resulting hydroaromatic compound with an agent which introduces a hydrophile group thereby rendering the compound water soluble.

The non-aromatic hydrocarbon radical containing at least three carbon atoms is preferably of an aliphatic nature but may also be of a cyclic structure such as the radicals derived from naphthenic alcohols. The aliphatic radicals may be either normal straight chain or branched chain in character. Of the normal aliphatic radicals there may be mentioned, for example, the propyl, butyl, amyl, hexyl, heptyl, octyl, nonyl, decyl, undecyl, dodecyl, tridecyl, tetradecyl, hexadecyl and other higher members of the series. As examples of suitable iso radicals there may be mentioned isopropyl, isobutyl, isoamyl, isohexyl, isoheptyl, isooctyl, isononyl, isodecyl, iso-undecyl, isododecyl, isotridecyl, isotetradecyl, isohexadecyl and other members of the series. The scope of the present invention includes not only those compounds having only one of the above mentioned radicals attached to the aromatic or hydroaromatic nucleus but also those compounds having more than one alkyl group, the only requirement being that the nucleus contain a hydroxy group suitable for the introduction of a hydrophile group or radical. Also the invention includes those compounds wherein the above aliphatic radicals contain some other group as, for example, an oxy or hydroxy group.

The aromatic nuclei of the above mentioned compounds may be either of a monocyclic or a polycyclic character and include, for example, those derived from benzol, toluols, xylols, naphthalene, phenanthrene, anthracene, diphenyl, diphenylmethane, diphenylethane, phenylnaphthylmethane, and the like. The invention includes substances in which the aromatic nucleus is substituted with radicals other than the lower molecular alkyl radicals, such as methyl and ethyl groups existing in some of the aromatic compounds above set out, examples of said groups being additional hydroxy radicals or ether groups or other like groups.

In accordance with a particular feature of the present invention, the raw materials subjected to hydrogenation need not be chemically pure, for in such form they lead to satisfactory results. Therefore, one may use mixtures of various compounds, both as to the aromatic component and as well as to the alkylating or other substituting component. These mixtures comprise especially the homologues and analogues which are distinguished from each other by the length of the carbon chain or in the number of alkyl groups attached to the hydroaromatic nucleus.

In a more limited embodiment, the present invention involves methods by which the substituted hydroxyaromatic compounds are produced. These methods are already known in part but up to the present time have never been used in the subsequent treatment herein disclosed for the production of capillary active substances.

The simplest method of obtaining these raw materials which are subjected to hydrogenation involves condensing primary, secondary or tertiary alcohols or their mixtures with phenols, cresols, xylenols, thymol, carvacrol, oxydiphenyls, naphthols, oxyanthracenes, oxyphenanthrenes, oxyquinolines and other like compounds or their mixtures. This condensation reaction may be aided generally by the use of substances having catalytic action, particularly acids such as for example, sulfuric acid, phosphoric acid, and dilute perchloric acid, but also salts such as zinc chloride, aluminum chloride, borofluoride, iron chloride, aluminum fluoride, and aluminum bromide. Fuller's earth and other like surface active bodies also may assist in the condensation reaction.

As examples of the alcohols which may be used in the above condensation reaction, there may be mentioned, for example, propyl, isopropyl, butyl, isobutyl, amyl, isoamyl, octyl, iso-octyl, decyl, isodecyl, dodecyl, tetradecyl, hexadecyl, beta-ethyl butyl alcohols; also pentyl-methyl-carbinol, methyl-isobutyl-carbinol and other like compounds.

In accordance with another embodiment of the present invention, the substituted hydroxyaromatic compound is produced by condensing olefine hydrocarbons from any one of a number of sources with aromatic hydroxy compounds of the nature hereinbefore disclosed, using the above mentioned condensation catalysts. Olefines satisfactory for the present process can be obtained from the above disclosed alcohols by splitting off water thereby producing, for example, propylene, butylene, pentylene, isopentylene, hexylene, octylene, iso-octylene, nonylene, decylene, undecylene, dodecylene, tridecylene, tetradecylene, hexadecylene, mixtures of their isomers; trimethylpentene and other like compounds.

A substantial advantage of this embodiment of the invention lies in the ability to use waste olefines which result from various technical or commercial processes. These waste olefines may be obtained, for example, during the carbonization of wood, during the distillation of lignite, during cracking of mineral oils including paraffins and also during the various benzine syntheses. These olefines or olefine-containing mixtures may be referred to collectively as olefines resulting from thermal reactions of organic materials, those obtained from reactions of hydrocarbons or hydrocarbon-containing mixtures being especially suitable.

Another source of olefines contemplated by and within the broad scope of the present invention lies in the process wherein olefine-containing fractions are synthetically prepared from carbon monoxide and hydrogen. Here the olefines may be produced, for example, by the process described in "Brenstoff-Chemie, Zeitschrift fur Chemische Technologie der Brennstoffe und Ihrer Nebenprodukte", vol. 9, No. 2 of January 15, 1928, page 21, also vol. 13, No. 24, of December 15, 1932, page 461, et seq.

When mixtures of hydrocarbons containing olefines are to be used as the raw material, they may be employed either immediately after production in the condensation reaction or after the hydrocarbons other than olefines in the mixture have been separated out. However, for economic reasons, it is usually desirable to separate the olefines from the hydrocarbon mixture before the condensation is commenced, for if this procedure is followed a mass is treated which possesses a higher concentration of olefines. The olefine compounds concentrated in this manner may be condensed with the hereinbefore disclosed hydroxy aromatic compounds, as phenols, naphthols and the like, with the aid of the hereinbefore mentioned condensing catalysts, especially good results being obtained by the use of dilute perchloric acid. The condensation may be assisted by the use of moderately elevated temperatures. During the heating, it is advantageous that the mixture be thoroughly stirred in order that the catalyst will cause maximum condensation. The invention contemplates any of the conventional methods of contacting the olefines with the catalyst, that is, by ordinary batch methods or by continuously flowing the liquid over the catalyst.

In the foregoing condensation process, the proportions of the ingredients may be varied within wide ranges, although it is usually preferable to mix the olefines with the hydroxyaromatic compounds in molecular proportions. The use of a larger or a smaller proportion of either of the components does not hinder the condensation. If molecular proportions are not used, then after the condensation and separation of the catalyst is complete, the separation of the unreacted materials may be effected by means of distillation. If this procedure is followed the alkylated hydroxyaromatic hydrocarbon is obtained in a comparatively concentrated form. This material may be used alone or together with other substances in disinfectants aside from its use in accordance with the primary purpose of the present invention.

In accordance with another embodiment of the invention, the substituted hydroxyaromatic compounds may be produced through the use of aliphatic compounds containing at least one halogen atom, which substances are used instead of the alcohols or olefines hereinbefore disclosed for the condensation reaction with the aromatic hydroxy compounds, such as phenols and naphthalenes. In this embodiment there may be used the chloride or the bromide of hexane, heptane, octane, nonane, decane and undecane, as well as 1,2 dibromo-decyl halides. When these halides are employed, the condensation may be aided by the use of a di- or trivalent metal such as zinc, cadmium, aluminum, magnesium and other such metals.

In accordance with a still further embodiment of the invention, the substituted hydroxyaromatic compounds may be obtained in the form of ketones by the action of carboxylic acids or their derivatives, such as esters, anhydrides and chlorides on hydroxy aryl compounds, such as phenols, cresols, naphthols and the like.

The present invention contemplates any of the hydrogenation processes known to the prior art for introducing hydrogen into the substituted hydroxyaromatic compounds hereinbefore disclosed. The preferred process in which very good results are obtained is accomplished by the use of catalysts at high temperatures and pressures in the presence of hydrogen, suitable catalysts comprising the noble metals, nickel, copper, cobalt, chromium and mixed catalysts composed of these same metals or their compounds, or sulfur proof catalysts containing molybdenum or tungsten. The reaction may be very satisfactorily carried out at temperatures of 150–300° C. at pressures ranges from 20–300 atmospheres. The invention however, is not limited to such ranges.

As a result of the hydrogenation reaction, there are obtained hydroaromatic hydrocarbons substituted by an alkyl group containing at least three carbon atoms or a cycloalkyl group with at least three carbon atoms. The aromatic radical may be completely hydrogenated or only partially hydrogenated and the invention is comprehensive of both such products. Furthermore, the invention includes the variation wherein oxygen atoms contained in the substituting radicals are eliminated during the hydrogenation, for example, when the process is applied to hydroxyaromatic compounds substituted by an organic acyl radical.

After the hydrogenation step is complete, hydrophile groups or radicals containing hydrophile groups are introduced into the hydroaromatic nucleus. Suitable hydrophile groups include only those which have the property of rendering the compounds water soluble, such, for example, as sulfonic acid, sulfuric acid esters, thiosulfuric acid esters, phosphoric acid esters and carboxylic, polyoxy and polyether groups. The hydrophile group of the last mentioned nature may contain several ether or oxy groups, these compounds having proved themselves quite valuable for the present purpose.

These hydrophile groups may be introduced into the hydroaromatic radical by any of the known or conventional processes. A sulfonic acid or a sulfuric acid ester group may be introduced, for example, through the use of a sulfonation medium, for example, chlorosulfonic acid or of an additive compound of chlorosulfonic acid or of sulfur trioxide with an ether, ester or tertiary amines, such as pyridine. During the sulfonation, it is permissible to use various solvents or water-absorbing or binding materials, such substances frequently leading to improved results. Upon completion of the sulfonation, the resulting mass is neutralized with an alkaline reacting material, such, for example, as an alkali metal hydroxide, an alkali metal carbonate, an alkali metal silicate, alkaline earth metal hydroxides and equivalent compounds, gaseous ammonia, or any strong organic base.

If carboxylic groups are to be added to impart the water solubility, the said radicals can be added by converting the substituted hydroaromatic alcohols which have been obtained by hydrogenation to their halides and in turn converting these products to organic magnesium compounds and thereafter reacting with carbonic acid, all in accordance with the Grignard reaction.

In order to impart water solubility by the use of polyoxy or polyether groups, the hydrogenated aromatic compounds are reacted with alkylene oxides such as, for example, ethylene oxide, glycide, epichlorhydrine or other like compound. Water solubility can also be imparted in known manner by esterifying with acids which contain one or more hydroxyl groups such as glycolic acid, lactic acid or glyceric acid, which groups may be utilized for the addition of other hydrophile groups by adding mineral acid ester groups, for example, sulfuric acid ester groups. From the foregoing reactions, it will be observed that the hydrophile groups may be connected directly or indirectly with the hydrogenated aromatic nucleus.

In accordance with another embodiment of the invention, the alkylated hydroaromatic alcohols which have been produced by hydrogenation may be converted into unsaturated compounds by splitting off of water and these unsaturated compounds can be used after some alteration, in a reaction which adds a hydrophile group. However, one can also introduce at the double bonds of these unsaturated materials one or more hydrophile groups, for example, sulfuric acid groups or groups of mercaptanic acids such as mercapto active acid.

The capillary active substances of the present invention may be used alone or in admixture with other known capillary active materials, as cleansing mediums or as wetting, washing, purifying, emulsifying and dispersing agents. They may be easily prepared in marketable form for they can be spray dried without difficulty and thereby prepared in granular form. Furthermore, these agents can be prepared for marketing in the form of lumps, bars, flakes, tubes, needles and as well in the form of dough or as a plastic mass or even in solution in water with or without other solvents.

*Example 1*

Two hundred and thirty-four parts by weight of normal heptyl-ortho-cresol ketone are hydrogenated in the presence of a nickel catalyst at a temperature of 200° C. and pressure of 100 atmospheres of hydrogen. After separation of the catalyst, the product appears as a clear, colorless oil which boils at 176-182° C. under a pressure of 13 mm. and whose hydroxyl number is 245.

Ninety parts by weight of the hydrogenated product are dissolved in 500 parts by weight of ether and during cooling this mass is sulfonated with 46 parts by weight of chlorsulfonic acid. After neutralization and thorough reaction the sodium salt of the sulfonation product is obtained. Solutions of this product in water appear clear and have the property of producing excellent foams. They also have very good wetting properties.

*Example 2*

Normal undecylorthocresol ketone is catalytically hydrogenated under the above described conditions thereby producing a colorless, crystalline mass whose melting point is 55° C. and whose boiling point at 12 mm. pressure is 215-220° C. The resulting mass is subjected to sulfonation as described in Example 1 and after neutralization, a sodium salt of the sulfonated mass is obtained in the form of a colorless powder. The foaming and wetting qualities of a dilute solution of this material are excellent.

In the same manner, one can also use as raw materials, a mixture of normal nonylorthocresol ketone, normal undecylorthocresol ketone, normal tridecylorthocresol ketone, and normal pentadecylorthocresol ketone. These products may be obtained in known manner from cocoanut fatty acids and cresols.

*Example 3*

A product obtained by the condensation of a mixture of fatty alcohols composed predominantly of molecules containing 6, 8 and 10 carbon atoms with technical orthocresol, which is a mixture of (iso-) alkylcresols, is hydrogenated under a pressure of 50-200 atmospheres of hydrogen in the presence of a nickel-containing catalyst. Less than 10% catalyst based upon the mixture of alkyl cresols is necessary for this reaction to be carried out successfully. This mass is then sulfonated by treating with 8 parts by weight of water free pyridine and 6.5 parts by weight of chlorsulfonic acid mixed at a temperature between minus 10 and plus 30° C. The sulfonation is initially carried out between 40-50° C. and toward the end of the reaction the temperature reaches 60° C. The reaction product is then neutralized with a dilute solution of sodium hydroxide. After the reaction has been completed, the material is then thoroughly freed from pyridine by heat from a water bath and vacuum distillation. The dilute solution of the product is then reduced to a powder form by means of spray drying. The finished product has the property of a good capillary active substance and also constitutes a very excellent substitute for soap.

Alternatively, the sulfonation can be carried out by means of any of a number of other known sulfonating agents.

The above named alcohols, used for the purpose of preparing the raw materials for the condensation with cresols, may be replaced by any of their fatty alcohol homologues, or as well by synthetically prepared higher molecular alcohols such as are obtained, for example, in appropriate methanol synthesis reactions.

Example 4

Four hundred and eighty-five parts by weight of olefines obtained in known manner from a mixture of fatty alcohols containing 6, 8, 10 and 12 carbon atoms by the splitting off of water are condensed with 1300 parts by weight of technical orthocresol in the presence of dilute perchloric acid. The purified reaction products are subjected to a fractional distillation, the higher boiling portion containing the alkyl cresols which have been formed. This fraction is then hydrogenated at a temperature of 200–220° C. under a pressure of 40–50 atmospheres in the presence of a nickel-containing mixed catalyst. For the most part, the hydrogenated product contains the perhydrogenated monoalkyl cresols. This mass can, if desired, be purified by means of distillation. It is then subjected to a sulfonation treatment while in solution with the use of chlorsulfonic acid at minus 10 to minus 5°. Neutralization is then carried out with sodium hydroxide. As a final product a white powder comprising a mixture of the sodium salts of the sulfonation product of the hydrogenated alkylated technical orthocresol is obtained. This product produces a clear solution in water which has very good foaming and wetting properties.

In the place of the named olefines used for the condensation of cresols for the purpose of preparing the substituted hydroxyaromatic compound, one can also use olefines which are obtained from the homologues of fatty alcohols or from synthetically prepared higher alcohols such as those which result, for example, from appropriate methanol synthesis reactions.

Example 5

A commercial orthocresol product is condensed with naphthenic alcohols which have been obtained by high pressure reduction of naphthenic acids, thereby producing a mixture of naphthenyl cresols.

One thousand parts by weight of the condensation product in the presence of 50 parts by weight of a hydrogenation catalyst are easily hydrogenated at a temperature of 180–190° C. and under a superatmospheric pressure of 40 atmospheres, thereby producing naphthenylmethyl-cyclohexanols. As an alternative procedure, this catalytic hydrogenation may be accomplished through the use of alkali metals and lower molecular alcohols. The hydrogenation product after separation from the catalyst is converted by sulfonation and neutralization into a clear, water soluble, capillary active substance. The sulfonation itself may be carried out in the same manner as described in Example 4.

Example 6

One hundred and seventy parts by weight of dodecylene is condensed with 108 parts by weight of orthocresol in the presence of fluoroboride. The resulting product is hydrogenated in the presence of 5% of an active nickel catalyst at a temperature of 180–200° C. and under a pressure of 50 atmospheres of hydrogen. The hydrogenated product which contains a substantial quantity of paradodecyl orthomethyl cyclohexanol is separated from the catalyst and is added to a sulfonating mixture containing 200 parts by weight of water free pyridine and 135 parts by weight of chlorosulfonic acid, said mixture being at a temperature of 40–50° C. After termination of the addition, the mixture is thoroughly stirred for sometime while being maintained at a temperature of 60° C. The sulfonated product is then neutralized with the calculated amount of dilute sodium hydroxide solution (33% sodium hydroxide) and thereby converted to the sodium salt. After separation of the pyridine, the reaction product is dried and a colorless powder is obtained, a water solution of which has very strong capillary active properties.

Example 7

In the presence of 40 parts by weight of technical perchloric acid (40% HClO$_4$), 900 parts by weight of paracresol are condensed with 1800 parts by weight of synthetic benzine whose final boiling point is about 220° C. and which contains about 33% of an olefine hydrocarbon. After removal of the unreacted cresols and the paraffin hydrocarbons, a mixture of homologues of alkylated paracresols is obtained.

One thousand two hundred parts by weight of this condensation product are hydrogenated in the presence of 80 parts by weight of a nickel-containing hydrogenation catalyst with the use of a temperature of from 180–190° C. and a pressure of 40 atmospheres of hydrogen. At the completion of the hydrogenation, the catalyst is separated from the product.

One thousand one hundred and eighty parts by weight of the resulting mixture of alkylated 4-methyl cyclohexanols are added to the reaction product obtained when 1530 parts by weight of freshly distilled dimethyl aniline is reacted with 675 parts by weight of chlorsulfonic acid. At the completion of the addition, the material is agitated or homogenized for some time at a temperature of 60–65° C. After the addition of ice, 1360 parts by weight of a dilute solution of sodium hydroxide are stirred into the mixture. The dimethyl aniline which has separated out is removed from the product. If deemed necessary, inorganic or organic salts may be added to or reacted with the remaining product, which can then be dried by a spraying process.

Example 8

The product obtained from the synthetic benzine described in Example 7 and metacresol consisting of a mixture of the homologues of isoalkyl metacresols is hydrogenated at a pressure of 40–50 atmospheres of hydrogen at a temperature of 160–200° C. in the presence of a kieselguhr precipitated noble metal catalyst. The hydrogenated product is separated from the catalyst as by filtration.

Five thousand eight hundred parts by weight of normal methylorthotoluidine are slowly added to 1520 parts by weight of chlorsulfonic acid while cooling and stirring and to this mixture 2280 parts by weight of this hydrogenated product are added. After the completion of the reaction, the reaction product is converted to the sodium salt by the addition of a calculated amount of a dilute solution of sodium hydroxide (36.5% NaOH). The normal methyl orthotoluidine which separates out is removed from the end product, and the reaction product which has been obtained in this manner is then dried.

*Example 9*

Through the reaction of $HBF_4$, a synthetic benzine containing 29% olefine hydrocarbons and whose final boiling point is 210° C. is condensed with cresol (a mixture of about 50 parts orthocresol, 25 parts metacresol and 25 parts paracresol). One thousand one hundred parts by weight of the resulting mixture of homologues or isomers of isoalkyl cresols are perhydrogenated in the presence of 100 parts by weight of a hydrogenation catalyst prepared according to the process of Adkins at a temperature of 200° C. and a pressure of 80 atmospheres of hydrogen. The hydrogenation product is then separated from the catalyst by means of a filter press as described in Example 6 and is then converted into the sodium salts of the sulfuric acid half esters of the mixed products.

*Example 10*

An excess of xylenol is condensed with an olefine-containing hydrocarbon mixture whose boiling point at 760 mm. is 60–220° C., in the presence of 1% of a dilute solution of perchloric acid (60% HClO₄). A mixture of homologues of isoalkyl xylenols is obtained, which product is then hydrogenated in the presence of 10% by weight of a copper-containing catalyst at a temperature of 200–220° C. and at a pressure of 100–120 atmospheres. The hydrogenation product is then separated from the catalyst by means of a centrifuge.

Two hundred and thirty parts of the hydrogenation product which has previously been distilled if so desired, are added to the addition product of 200 parts by weight of an anhydrous pyridine base mixture and 135 parts by weight of chlorsulfonic acid, and then while stirring the mixture containing the hydrogenation product is heated to a temperature of 60–65° C. and maintained there for some time. After completion of the reaction, the reaction product is treated with a calculated amount of a dilute potassium hydroxide solution. The pyridine base mixture which separates is removed. The potassium salt obtained is then converted to a solid form by means of a spray drying process.

*Example 11*

One hundred and fifty-four parts by weight of alpha-naphthol, 325 parts by weight of synthetic benzine, such as described in Example 7 containing 33% olefines, 5 parts by weight of perchloric acid (technical 50% HClO₄), are thoroughly mixed at 70–80° C. and then reacted with the aid of intensive stirring at 90–100° C. Alkylated alpha-naphthols are isolated from the obtained reaction mixture by means of fractional distillation and are then hydrogenated in the presence of 10% by weight of an active hydrogenation catalyst at a temperature of 200–210° C. and raised hydrogen pressure (100–150 atmospheres). Two hundred and sixty parts by weight of the hydrogenation product which has been separated from the catalyst are, during thorough stirring, slowly added at a temperature of minus 10 to minus 5° C. to a mixture of 200 parts by weight of dibutyl ether and 135 parts by weight of chlorsulfonic acid. After the completion of the addition, the mixture is thoroughly stirred for some time at a temperature of minus 5 to plus 10° C. After the completion of the reaction, the mixture is neutralized with a mixture of dilute sodium hydroxide (25% NaOH) and small particles of ice, at the same time taking care that the reaction proceeds at a low temperature. The dilute solution after separation of the dibutyl ether is dried, and the sodium salt is obtained as a dry product. A spray drying process can alternatively be employed if desired after the addition of inorganic or organic salts to the diluted solution obtained after the dibutyl ether has been removed. Examples of said salts are sodium sulfate, tetrasodium pyrophosphate, metaphosphates, polyphosphates, especially sodium naphthalene sulfonic acids, sodium tetrahydronaphthalene sulfonic acids, sodium benzol sulfonic acid and others of a similar nature.

In the same manner, one can also use beta-naphthol or hydroxydiphenyl for the initial condensation reaction, and the condensation product obtained can be further reacted as above described.

*Example 12*

A mineral oil distillate which has been obtained according to the Dubbs process and whose boiling point is between the range of 70–200° C. at a pressure of 760 mm. and which contains 40% of olefine hydrocarbons is condensed with an excess of technical orthocresol. The cresol which has not reacted and also the paraffin hydrocarbons are separated from the condensation product by means of fractional distillation.

One thousand one hundred parts by weight of the condensation product are hydrogenated in the presence of 100 parts by weight of an active hydrogenation catalyst at a temperature of 200–220° C. and under a pressure of 100 atmospheres of hydrogen.

During cooling, 900 parts by weight of dry technical pyridine bases are added to 440 parts by weight of sulfuric acid anhydride and to the addition product (anhydropyridinium-, and picolinium-sulfonic acids) 1000 parts by weight of the hydrogenation product which has been separated from the catalyst by filtration are added with thorough stirring at a temperature of 40–50° C. In order to complete the reaction the mixture is thoroughly stirred for some time at a temperature of 60–65° C. A calculated amount of dilute sodium hydroxide (33–35% NaOH) is added to the reaction mixture with appropriate cooling. The pyridine base mixture which is set free is then removed and the reaction product is dried after the addition, if so desired, of other organic or inorganic salts.

*Example 13*

A cracked distillate rich in olefines obtained by the cracking of a mineral oil according to a modified gyro process comprising a fraction whose boiling point is in the range of 80–210° C. at a pressure of 760 mm. and which contains about 70% of olefine hydrocarbons is condensed with technical orthocresol with the aid of the catalytic effect of dilute perchloric acid at an elevated temperature. The obtained condensation product after isolation by means of fractional distillation, for the most part, consists of a mixture of isoalkylated cresols.

One thousand one hundred and fifty parts by weight of the condensation product which, if so desired, may first be purified by distillation are perhydrogenated in the presence of 100 parts by weight of a hydrogenation catalyst at a temperature of 210–220° C. and a raised hydrogen pressure in a mixing autoclave, after which the hydrogenation product is separated from the catalyst by means of a filter press. Six hundred parts by weight of a distilled dried pyridine base mixture is reacted during cooling with 1200 parts by weight of a finely pulverized potassium pyrosulfate, to obtain a mixture of potassium sulfate, anhydropyridinium sulfonic acid and pyridine. Into this mixture there is added 1200 parts by weight of the hydrogenation product. In order to complete the reaction, the mixture is agitated or homogenized for some time at an elevated temperature. After the addition of a calculated amount of a dilute solution of potassium carbonate or potassium hydroxide, the pyridinium salt of the sulfonation product is converted into the potassium salt. After removal of the separated pyridine base mixture, the water solution of the potassium salt together with the potassium sulfate is converted into a solid form by means of a spray drying operation.

*Example 14*

A mixture of isoalkylated cresols are obtained by condensing an excess of a technical orthocresol product with a cracked gas oil whose boiling point lies in the range between 205 and 300° C. at a pressure of 760 mm. and which contains 70% of unsaturated hydrocarbons. This mixture, after the addition of 10% by weight of an effective hydrogenation catalyst, is easily perhydrogenated at a temperature of 200° C. under a raised hydrogen pressure. In order to convert the product into the sulfonate, 300 parts by weight of the hydrogenation product after separation from the catalyst is added to a reaction mixture of 200 parts by weight of dried pyridine with 135 parts by weight of chlorsulfonic acid. In order to complete the sulfonation reaction, the mixture is stirred for some time at an elevated temperature. By means of the addition of a calculated amount of dilute sodium hydroxide if necessary with the addition of ice, the pyridinium salts are converted to the sodium salts. In a short time the reaction mixture upon standing separates into two layers, the bottom layer comprising a dilute solution of the inorganic salts being removed, after which the pyridine is removed from the top layer by means of vacuum distillation. The distillation residue is converted to the solid product by means of a spray drying operation. Before the drying is carried out, inorganic or organic salts may be added to the residue.

*Example 15*

One thousand three hundred parts by weight of a mixture of chlorinated paraffin hydrocarbons that distill without decomposition within the range of 60–100° C. at a pressure of 12 mm., are condensed with 2500 parts by weight of technical orthocresol at an elevated temperature in the presence of a suitable catalyst. There is then isolated from the reaction mixture the condensation product which consists for the most part of a mixture of mono-iso-alkyl cresols.

One thousand parts by weight of this condensation product are hydrogenated at a temperature of 180–200° C. and a pressure of 50 atmospheres of hydrogen in the presence of 100 parts by weight of a copper nickel catalyst which has been precipitated on pumic and after completion of the hydrogenation the hydrogenation product is separated from the catalyst. The hydrogenation product is then purified by distillation and converted to the water soluble sulfonation product according to the process described in Example 12.

*Example 16*

Phenol is condensed with an aliphatic hydrocarbon rich in olefines to produce a mixture of alkyl substituted phenols of medium molecular weight of about 210. Two hundred and ten parts of the condensation product are hydrogenated in the presence of 10 parts by weight of a hydrogenation catalyst at a temperature of 160–180° C. by the use of a pressure of 30–40 atmospheres of hydrogen. The mixture of isoalkyl cyclohexanols so obtained is converted to a mixture of alkyl substituted cyclohexene by heating with water-free zinc chloride, followed by distillation.

Two hundred parts by weight of the alkylated cyclohexene are reacted at slightly elevated temperatures with 120 parts by weight of thioglycolic acid and if necessary with the addition of a solvent such as ether, butyl ether, ethylene chloride and similar solvents. After separation of the excess thioglycolic acid and the solvent which may be present, by distillation, the residue which consists for the most part of isoalkyl cyclohexyl thioglycolic acids is neutralized with a dilute sodium carbonate solution. After the addition of calcined sodium carbonate and tetrasodium pyrophosphate, the mixture is converted into a solid form by means of a spray drying process.

*Example 17*

One and three-tenths parts by weight of a mixture of alkyl chlorides obtained by passing chlorine into an olefine-free hydro-carbon mixture of a boiling point lying within the range 60–100° C. at 12 mm. (consisting mainly of $C_9H_{20}$ to $C_{13}H_{28}$) and which contains 23.5% chlorine, is led into 2.5 parts by weight of technical orthocresol and 0.04 part by weight of granulated zinc while the mixture is being stirred thoroughly at a temperature of 140° C. After heating for some time at a temperature of 150–170° C., the reaction product is distilled. After separating off the first portion of the distillate which consists mainly of cresol and hydrocarbons, a mixture of alkylated cresols is obtained.

The alkyl cresols are hydrogenated in the presence of 10% of a nickel catalyst with the use of a pressure of 180 atmospheres of hydrogen and a temperature of 200° C. In this manner, the corresponding alkyl-methyl-cyclohexanols are obtained.

Two hundred and seventy-five parts by weight of a mixture of the methyl alkyl-cyclohexanols are led at a temperature of 15–30° C. into pyridine chlorsulfonic acid which has been obtained by mixing 200 parts by weight of pyridine and 130 parts by weight of chlorsulfonic acid at 0–20° C. with thorough stirring. The resulting reaction mixture is thoroughly stirred for some time at a temperature of 35–45° C. After neutralization with sodium hydroxide and the reaction is complete the sulfonate is obtained as a white powder which can be converted into extremely small hollow spheres by spray drying. The water solutions have excellent foaming properties and show very good wetting characteristics.

*Example 18*

Through the splitting off of water from the mixture of homologues of hydrogenated alkylated metacresol obtained in the same manner described in Example 8, a mixture of isoalkyl-methyl-cyclohexenes is obtained. Nineteen parts by weight of this mixture of isoalkyl-methyl-cyclohexenes are added to a mixture containing 32 parts by weight of glacial acetic acid and 12 parts by weight of a monohydrate of sulfuric acid, while being thoroughly stirred and kept at a temperature of minus 10 to minus 20° C. After completion of the reaction, 38 parts by weight of acetic acid anhydride is added and the reaction mixture stirred until a specimen is clearly soluble in water. The mixture is then poured on a small quantity of ice and there neutralized with a dilute solution of sodium hydroxide. One obtains the sodium salt of the sulfonation product as a light powder, which is very readily soluble in water. The water solutions have very good foaming and purifying properties and are stable in the presence of hard waters, and, furthermore, in the presence of acids and alkalis.

*Example 19*

Two hundred and twenty parts by weight of the mixture of isoalkyl-methyl-cyclohexanols which has been prepared according to Example 9 are converted into a mixture of sodium derivatives by means of metallic sodium or caustic soda in the known manner. The sodium alcoholate compounds are reacted with an excess of sodium chloroacetate with the exclusion of water. After the completion of the reaction and after the sodium chloride as well as the unchanged sodium chloroacetate is removed, the mixture of the sodium salts of the (isoalkyl-methyl-cyclohexyl)-oxy-acetic acids are obtained as a light colored powder which possesses properties similar to soaps. The sodium chloroacetates may be replaced by sodium salts of other halogen fatty acids or halogen sulfonic acid and other like compounds.

*Example 20*

Cresol is condensed with a mixture of olefines obtained in known manner from olefinic, cracked or distillation gases by means of thermopolymerization. A reaction product is obtained comprising isoalkyl cresols. One thousand parts by weight of this condensation product are hydrogenated in the presence of 80 parts by weight of a hydrogenation catalyst at a temperature of 180–200° C. under a pressure of 40 atmospheres of hydrogen. The mixture of isoalkyl-methyl-cyclohexanols obtained is separated from the catalyst and is converted in the usual manner by splitting off water into a mixture of isoalkyl-methyl-cyclohexenes.

Two hundred and fifty parts by weight of ether are mixed with 130 parts by weight of chlorsulfonic acid. To this mixture there is slowly added while cooling, 190 parts by weight of the above described mixture of isoalkyl-methyl-cyclohexenes. While the temperature slowly rises, this mixture is thoroughly stirred until the reaction goes to completion. After neutralization of the sulfonation product with sodium carbonate, the mixture of the sodium salt of the sulfonation product is obtained in the form of a white powder.

This application is a continuation-in-part of applicant's prior copending application, Serial No. 38,438 filed August 29, 1935.

It should be understood that the invention is not limited to the specific compounds nor the specific processes herein disclosed for it includes all variations coming within the scope of the appended claims.

We claim:

1. The process of producing capillary active materials which comprises hydrogenating a compound composed of an aromatic nucleus having attached thereto a non-aromatic hydrocarbon radical containing at least three carbon atoms, and a hydroxyl radical, and then introducing a hydrophile radical into the hydroaromatic nucleus by replacement of the said hydroxyl radical.

2. The process as described in claim 1 wherein the aromatic nucleus contains a single carbocyclic ring.

3. The process of producing wetting, cleaning, foaming agents and the like which comprises hydrogenating a hydroxyaromatic hydrocarbon compound, said compound having an alkyl radical containing at least three carbon atoms, sulfonating the resulting hydroaromatic compound and neutralizing to form a compound readily soluble in water.

4. The process of producing capillary active materials which comprises condensing a compound composed primarily of a non-aromatic hydrocarbon radical of at least three carbon atoms with a hydroxyaromatic hydrocarbon, hydrogenating the aromatic nucleus of the resulting substituted hydroxy aromatic compound and introducing a radical containing a hydrophile group into the nucleus by replacement of the hydroxyl radical.

5. The process of producing capillary active materials which comprises condensing an aliphatic hydrocarbon radical-containing compound with a hydroxyaromatic mononuclear hydrocarbon compound, hydrogenating the aromatic nucleus of the substituted hydroxy aromatic compound obtained and introducing a radical containing a hydrophile group into the nucleus by replacement of the hydroxyl radical.

6. Process of producing agents suitable for wetting, cleaning, foaming and the like purposes which comprises condensing a mixture of olefines resulting from thermal reactions of organic materials, which olefines contain at least three carbon atoms in their molecules with a hydroxyaromatic hydrocarbon, hydrogenating the aromatic nucleus of the resulting substituted hydroxyaromatic compound and reacting the hydroaromatic compound obtained with an agent which introduces a hydrophile group, thereby rendering the compound water soluble.

7. The process of producing capillary active materials which comprises condensing a mixture of olefines resulting from thermal reactions of hydrocarbons, which olefines contain at least three carbon atoms in their molecules with a hydroxy mononuclear aromatic hydrocarbon, hydrogenating the aromatic nucleus of the resulting substituted hydroxy aromatic compound and introducing a hydrophile group by replacement of the hydroxy radical attached to the nucleus.

8. The process of producing capillary active materials suitable for wetting, cleaning, foaming or the like purposes which comprises condensing a mixture of olefines resulting from thermal reactions of hydrocarbons, said olefines containing at least three carbon atoms in their molecules with a commercial mixture of hydroxy mononuclear aromatic hydrocarbon compounds, hydrogenating the aromatic nuclei of the resulting substituted hydroxyaromatic compounds, reacting the product obtained with a sulfonating agent and then neutralizing to form water soluble salts.

9. A capillary active agent comprising a perhydrogenated aromatic hydrocarbon nucleus of not more than 3 rings having attached thereto through a carbon to carbon bond a non-aromatic hydrocarbon radical containing at least six carbon atoms, and a saturated radical containing a hydrophile group which radical is attached to an alicyclic ring of said nucleus.

10. A new wetting, cleaning and foaming agent comprising a perhydrogenated aromatic hydrocarbon nucleus of not more than 3 rings having attached thereto through a carbon to carbon bond an aliphatic hydrocarbon radical containing at least six carbon atoms, and a saturated radical containing a hydrophile group which radical is attached to an alicyclic ring of said nucleus.

11. A capillary active agent comprising a perhydrogenated aromatic hydrocarbon nucleus of not more than 3 rings having attached thereto through a carbon to carbon bond a normal aliphatic hydrocarbon radical containing at least six carbon atoms, and a neutralized hydrophile saturated radical which renders said agent soluble in water said radical being attached to an alicyclic ring of said nucleus.

12. A capillary active agent comprising a perhydrogenated monocyclic aromatic nucleus having attached thereto through a carbon to carbon bond an aliphatic hydrocarbon radical containing at least six carbon atoms, and a saturated radical containing a hydrophile group which radical is attached to the alicyclic ring of said nucleus.

13. A new wetting, cleaning and foaming agent which comprises a perhydrogenated monocyclic aromatic hydrocarbon nucleus having attached thereto through a carbon to carbon bond a normal aliphatic hydrocarbon radical containing at least six carbon atoms and a saturated hydrophile group imparting water solubility said group being attached to the alicyclic ring of said nucleus.

14. A capillary active agent comprising a perhydrogenated polycyclic aromatic hydrocarbon nucleus of not more than 3 rings having attached thereto through a carbon to carbon bond a straight chain aliphatic hydrocarbon radical containing at least four carbon atoms, and a neutralized sulfuric acid radical attached to an alicyclic ring of said nucleus.

15. A capillary active agent for wetting, cleaning and foaming purposes which comprises a perhydrogenated benzol nucleus having attached thereto through a carbon to carbon bond a non-aromatic hydrocarbon radical containing at least six carbon atoms, and a saturated radical containing a hydrophile group which imparts water solubility and is attached to the completely hydrogenated benzol nucleus.

16. A capillary active agent comprising a perhydrogenated benzol nucleus having attached thereto through a carbon to carbon bond an aliphatic hydrocarbon radical containing at least six carbon atoms, and a neutralized sulfuric acid ester radical.

17. A capillary active agent comprising a perhydrogenated naphthalene nucleus having attached thereto through a carbon to carbon bond a non-aromatic hydrocarbon radical containing at least four carbon atoms and a hydrophile group imparting water solubility which group is attached to an alicyclic ring in said nucleus.

18. A capillary active agent comprising a perhydrogenated aromatic hydrocarbon nucleus of not more than 3 rings having attached thereto through a carbon to carbon bond an iso-aliphatic radical containing at least six carbon atoms, and a neutralized hydrophile group which renders said agent soluble in water attached to an alicyclic ring of said nucleus.

19. A wetting, cleaning and foaming agent which comprises a perhydrogenated monocyclic aromatic hydrocarbon nucleus having attached thereto through a carbon to carbon bond an iso-aliphatic radical containing at least six carbon atoms and a hydrophile group imparting water solubility attached to the alicyclic nucleus.

20. Alkali metal salts of sulfates having the general formula:

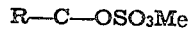

in which R represents a straight chain aliphatic hydrocarbon radical containing eight or more atoms, C stands for a cyclohexane nucleus, and Me represents an alkali metal.

21. Sulfates having the general formula:

in which R represents a hydrocarbon radical containing at least six carbon atoms selected from the category consisting of aliphatic and cycloaliphatic hydrocarbon radicals, C represents a polynuclear cycloaliphatic radical, and X represents a sulfate group which is directly attached to a carbon atom in the ring of C.

22. Alkali metal salts of sulfates having the general formula:

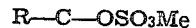

in which R represents a straight chain aliphatic hydrocarbon radical containing eight or more carbon atoms, C stands for a polynuclear cycloaliphatic radical, and Me represents an alkali metal.

23. The process of producing capillary active materials which comprises hydrogenating a compound composed of an aromatic nucleus having attached thereto a non-aromatic hydrocarbon radical containing at least six carbon atoms, and a hydroxyl radical, and then introducing a sulfate radical into the hydroaromatic nucleus by replacement of the said hydroxyl radical.

24. The process of producing capillary active materials which comprises condensing a compound composed primarily of a non-aromatic hydrocarbon radical of at least six carbon atoms with a hydroxyaromatic hydrocarbon, hydrogenating the aromatic nucleus of the resulting substituted hydroxy aromatic compound and introducing a sulfate radical into the nucleus by replacement of the hydroxyl radical.

25. Sulphates having the general formula:

in which R represents an aliphatic hydrocarbon radical of at least six carbon atoms, C represents a cycloaliphatic radical, and X represents a sulphate group directly attached to a carbon atom in the ring of C.

26. Sulphates having the general formula:

$$R—C_1—X$$

in which R represents an aliphatic hydrocarbon radical of at least six carbon atoms, $C_1$ represents a methyl substituted cycloaliphatic radical, and X represents a sulphate group which is directly attached to a carbon atom in the ring of $C_1$.

27. A capillary active agent comprising a perhydrogenated cresol nucleus having attached to the ring through a carbon to carbon bond an aliphatic hydrocarbon radical containing eight carbon atoms and a neutralized sulfuric acid ester radical.

WINFRID HENTRICH.
CARL ALBERT LAINAU.
WILHELM JAKOB KAISER.

CERTIFICATE OF CORRECTION.

Patent No. 2,283,438. May 19, 1942.

WINFRID HENTRICH, ET AL.

It is hereby certified that error appears in the printed specification of the above numbered patent requiring correction as follows: Page 3, second column, line 4, for the word "active" read --acetic--; line 9, for "emplsifying" read --emulsifying--; line 72, for "plug" read --plus--; page 6, second column, line 6, for "pumic" read --pumice--; and that the said Letters Patent should be read with this correction therein that the same may conform to the record of the case in the Patent Office.

Signed and sealed this 7th day of July, A. D. 1942.

(Seal)

Henry Van Arsdale,
Acting Commissioner of Patents.

CERTIFICATE OF CORRECTION.

Patent No. 2,283,438. May 19, 1942.

WINFRID HENTRICH, ET AL.

It is hereby certified that error appears in the printed specification of the above numbered patent requiring correction as follows: Page 3, second column, line 4, for the word "active" read --acetic--; line 9, for "emplsifying" read --emulsifying--; line 72, for "plug" read --plus--; page 6, second column, line 6, for "pumic" read --pumice--; and that the said Letters Patent should be read with this correction therein that the same may conform to the record of the case in the Patent Office.

Signed and sealed this 7th day of July, A. D. 1942.

(Seal)

Henry Van Arsdale,
Acting Commissioner of Patents.